(12) United States Patent
Kleber et al.

(10) Patent No.: US 8,643,241 B2
(45) Date of Patent: Feb. 4, 2014

(54) END RING ASSEMBLY AND METHOD OF FORMING SAME

(75) Inventors: Richard M. Kleber, Clarkston, MI (US); David R. Sigler, Shelby Township, MI (US); James G. Schroth, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 227 days.

(21) Appl. No.: 13/220,767

(22) Filed: Aug. 30, 2011

(65) Prior Publication Data

US 2013/0049516 A1 Feb. 28, 2013

(51) Int. Cl.
*H02K 17/16* (2006.01)

(52) U.S. Cl.
USPC .......................................... 310/211; 310/212

(58) Field of Classification Search
USPC ............... 310/210–212, 270, 156.22, 156.78, 310/156.79
See application file for complete search history.

(56) References Cited

U.S. PATENT DOCUMENTS

| | | | | | |
|---|---|---|---|---|---|
| 1,341,682 | A | * | 6/1920 | Starker | 228/140 |
| 1,371,233 | A | * | 3/1921 | Fries | 310/211 |

* cited by examiner

*Primary Examiner* — Dang Le
(74) *Attorney, Agent, or Firm* — Quinn Law Group, PLLC

(57) ABSTRACT

An end ring assembly for a rotor, wherein the rotor is rotatable about a central longitudinal axis, includes a plurality of annular sheets stacked adjacent one another. Each of the plurality of annular sheets has a first surface and a second surface spaced opposite the first surface. The end ring assembly also includes a braze material sandwiched between and joining only a first portion of the first surface of each of the plurality of annular sheets, and a corresponding second portion of the second surface of a respective adjacent one of the plurality of annular sheets without joining an entirety of the first surface of each of the plurality of annular sheets and the second surface of the respective adjacent one of the plurality of annular sheets. A method of forming the end ring assembly is also disclosed.

17 Claims, 5 Drawing Sheets

END RING ASSEMBLY AND METHOD OF FORMING SAME

TECHNICAL FIELD

The present disclosure generally relates to an end ring assembly for a rotor and a method of forming the end ring assembly.

BACKGROUND

Electromagnetic machines such as electric motors, generators, and traction motors are useful for converting one form of energy to another. For example, an electric motor may convert electrical energy to mechanical energy through an interaction of magnetic fields and current-carrying conductors. In contrast, a generator or dynamo may convert mechanical energy to electrical energy. Further, other electromagnetic machines, such as traction motors for hybrid vehicles, may operate as both an electric motor and/or a generator.

Electromagnetic machines often include an element rotatable about a central longitudinal axis. The rotatable element, i.e., a rotor, may be coaxial with a static element, i.e., a stator, and energy may be converted via relative rotation between the rotor and stator.

One type of electromagnetic machine, an alternating current induction motor, uses induced current flow to magnetize portions of the rotor during motor operation. More specifically, induced current may flow through conductor bars disposed parallel to the central longitudinal axis along a periphery of the rotor. Further, each conductor bar may be electrically connected to every other conductor bar by an end ring disposed at an end of the rotor. Such end rings generally have complex, intricate shapes and are difficult to die cast.

SUMMARY

An end ring assembly for a rotor, wherein the rotor is rotatable about a central longitudinal axis, includes a plurality of annular sheets stacked adjacent one another. Each of the plurality of annular sheets has a first surface and a second surface spaced opposite the first surface. The end ring assembly also includes a braze material sandwiched between and joining only a first portion of the first surface of each of the plurality of annular sheets and a corresponding second portion of the second surface of a respective adjacent one of the plurality of annular sheets without joining an entirety of the first surface of each of the plurality of annular sheets and the second surface of the respective adjacent one of the plurality of annular sheets.

In another embodiment, each of the plurality of annular sheets has a first surface, a second surface spaced opposite the first surface, an outer edge spaced apart from the central longitudinal axis, and a central rim having an inner wall disposed between the central longitudinal axis and the outer edge. Each of the plurality of annular sheets also defines a plurality of voids therethrough along the outer edge. In addition, the first surface of each of the plurality of annular sheets defines an annular recession therein extending radially from the inner wall to the outer edge.

A method of forming an end ring assembly of a rotor, wherein the rotor is rotatable about a central longitudinal axis, includes stacking a plurality of annular sheets adjacent one another, wherein each of the plurality of annular sheets has a first surface and a second surface spaced opposite the first surface. The method further includes sandwiching a braze material between the first surface of each of the plurality of annular sheets and the corresponding second surface of a respective adjacent one of the plurality of annular sheets to thereby form a workpiece. After sandwiching, the method includes compressing the workpiece. Additionally, after sandwiching, the method includes heating the workpiece to transition the braze material from an initial state to a flowable state. The method further includes, after heating, cooling the workpiece to transition the braze material from the flowable state to a fixed state and thereby join only a first portion of the first surface of each of the plurality of annular sheets and a corresponding second portion of the second surface of the respective adjacent one of the plurality of annular sheets without joining an entirety of the first surface of each of the plurality of annular sheets and the second surface of the respective adjacent one of the plurality of annular sheets to form the end ring assembly.

The above features and other features and advantages of the present disclosure are readily apparent from the following detailed description of the best modes for carrying out the disclosure when taken in connection with the accompanying drawings.

DETAILED DESCRIPTION

Figure 1:
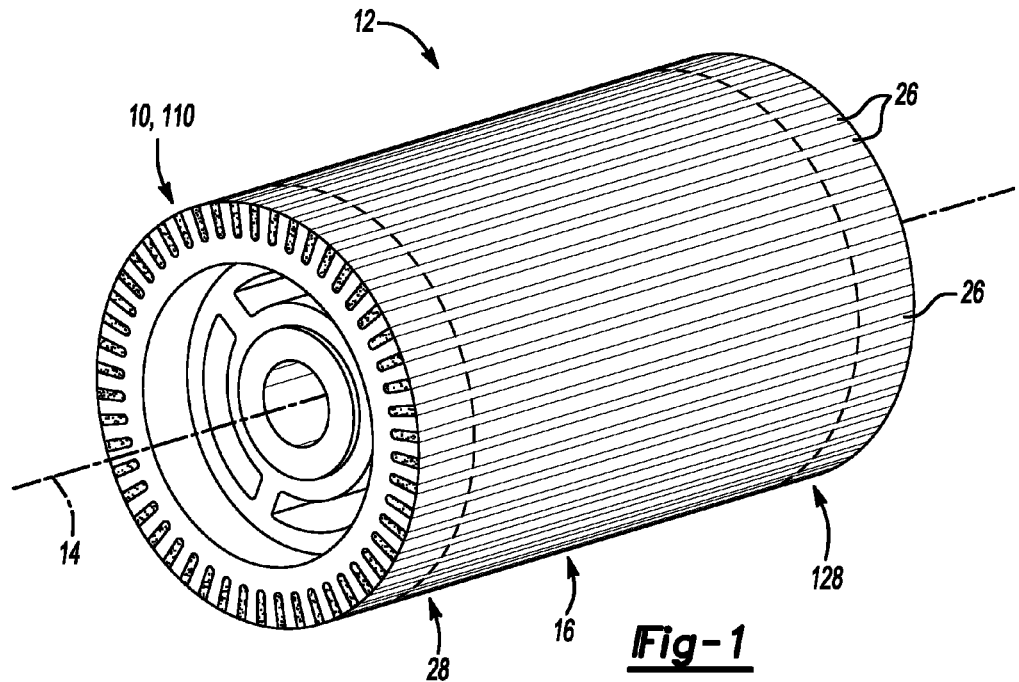
FIG. 1 is a schematic perspective illustration of a rotor including an end ring assembly.

Referring to the Figures, wherein like reference numerals refer to like elements, an end ring assembly 10, 110 for a rotor 12 is shown in FIG. 1. The end ring assembly 10, 110 may be useful for rotors 12 of electromagnetic machines (not shown) for automotive applications, including alternating current induction motors. However, the end ring assembly 10, 110 may also be useful for rotors 12 of electromagnetic machines for non-automotive applications, including generators and electric motors for residential and commercial applications.

Figure 2:
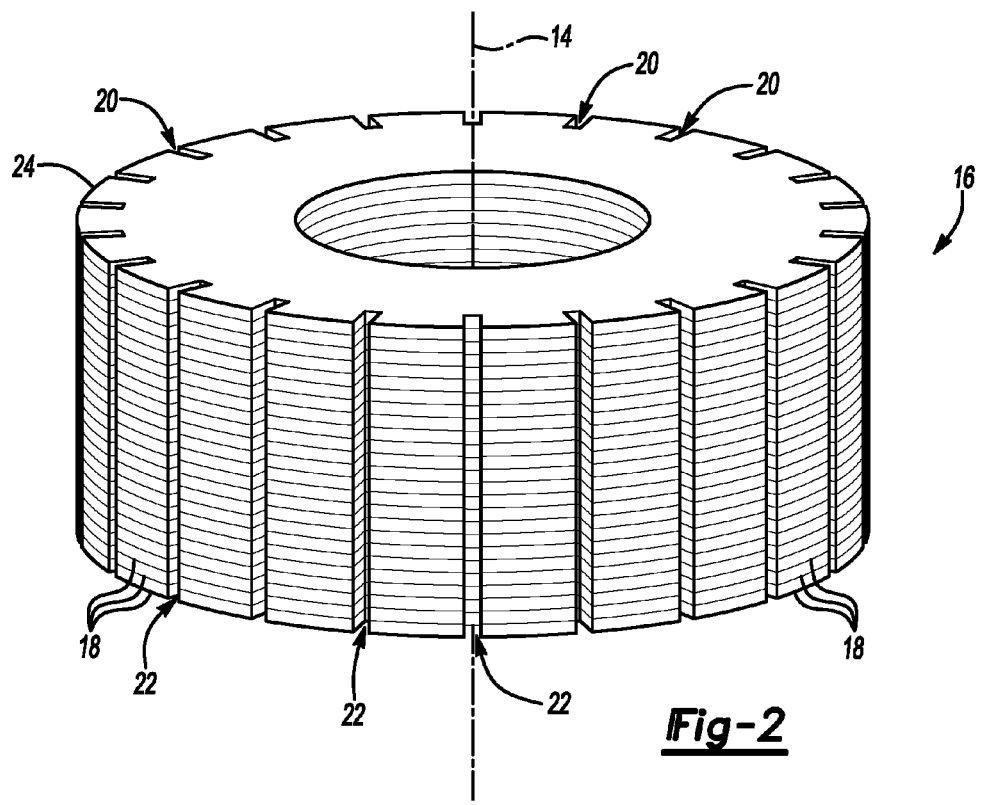
FIG. 2 is a schematic perspective illustration of a core of the rotor of FIG. 1.

By way of general explanation and described with reference to FIG. 1, the rotor 12 is rotatable about a central longitudinal axis 14 and may rotate with respect to a stationary stator (not shown) of the electromagnetic machine (not shown). Further, the rotor 12 may include a generally cylindrical core 16 or lamination stack formed from individual annular layers 18 (FIG. 2) of lamination steel, e.g., silicon steel, stacked adjacent one another. As shown in FIG. 2, each individual annular layer 18 of lamination steel may define a plurality of notches 20 therein about a periphery of each individual annular layer 18. Accordingly, when the individual annular layers 18 of lamination steel are stacked adjacent one another, the plurality of notches 20 may align to define a plurality of axial grooves 22 spaced about a periphery 24 (FIG. 2) of the generally cylindrical core 16. The axial grooves 22 may be parallel to the central longitudinal axis 14 and may each be configured to receive a conductor bar 26 (FIG. 1).

Therefore, referring again to FIG. 1, the rotor 12 may include a plurality of conductor bars 26 spaced equidistantly about the periphery 24 (FIG. 2) of the generally cylindrical core 16. Each conductor bar 26 may be configured to conduct electrical current during operation of the electromagnetic machine (not shown). Further, each conductor bar 26 may terminate at and connect with at least one end ring assembly 10, 110 at an end 28 of the rotor 12. Therefore, the rotor 12 may include two or more end ring assemblies 10, 110, e.g., one end ring assembly 10, 110 disposed at each respective end 28, 128 of the rotor 12. As such, the end ring assembly 10, 110 may electrically connect each of the plurality of conductor bars 26 to one another.

Figure 3:
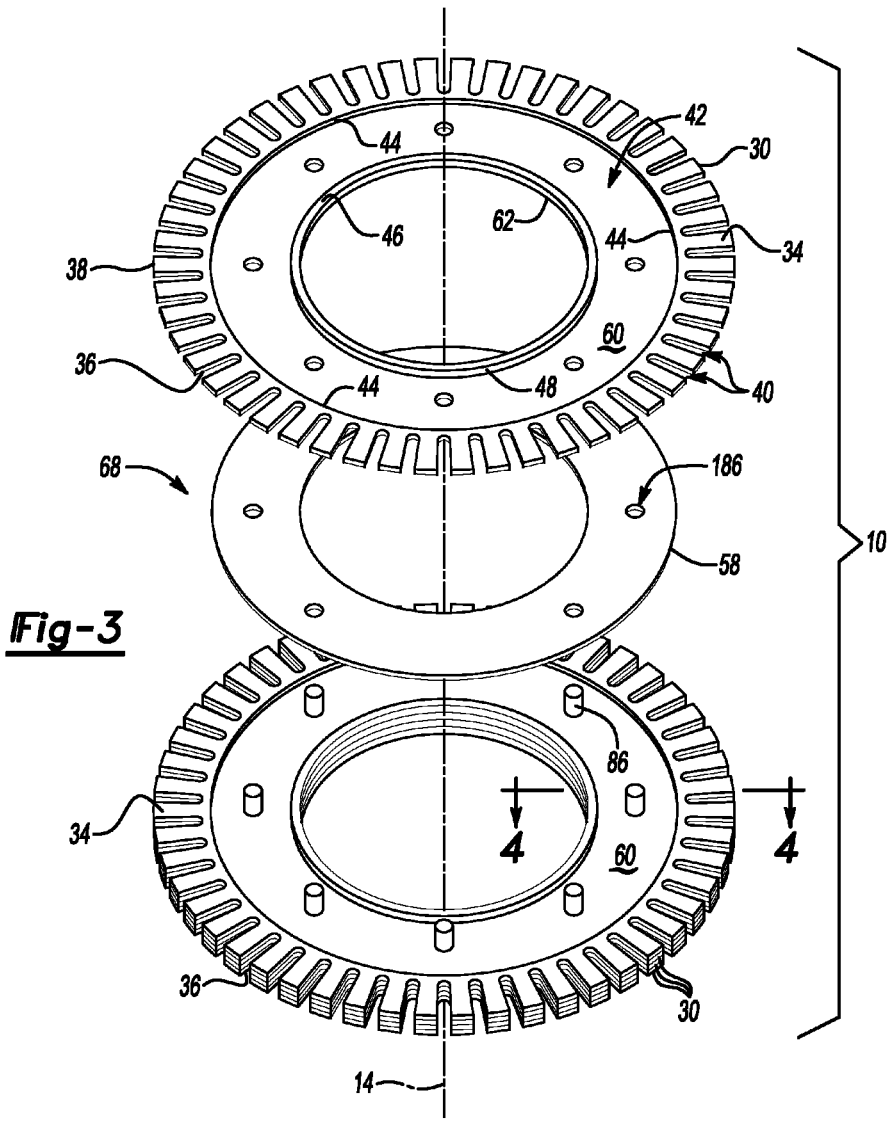
FIG. 3 is a schematic exploded perspective illustration of one embodiment of the end ring assembly of FIG. 1.
Figure 6:
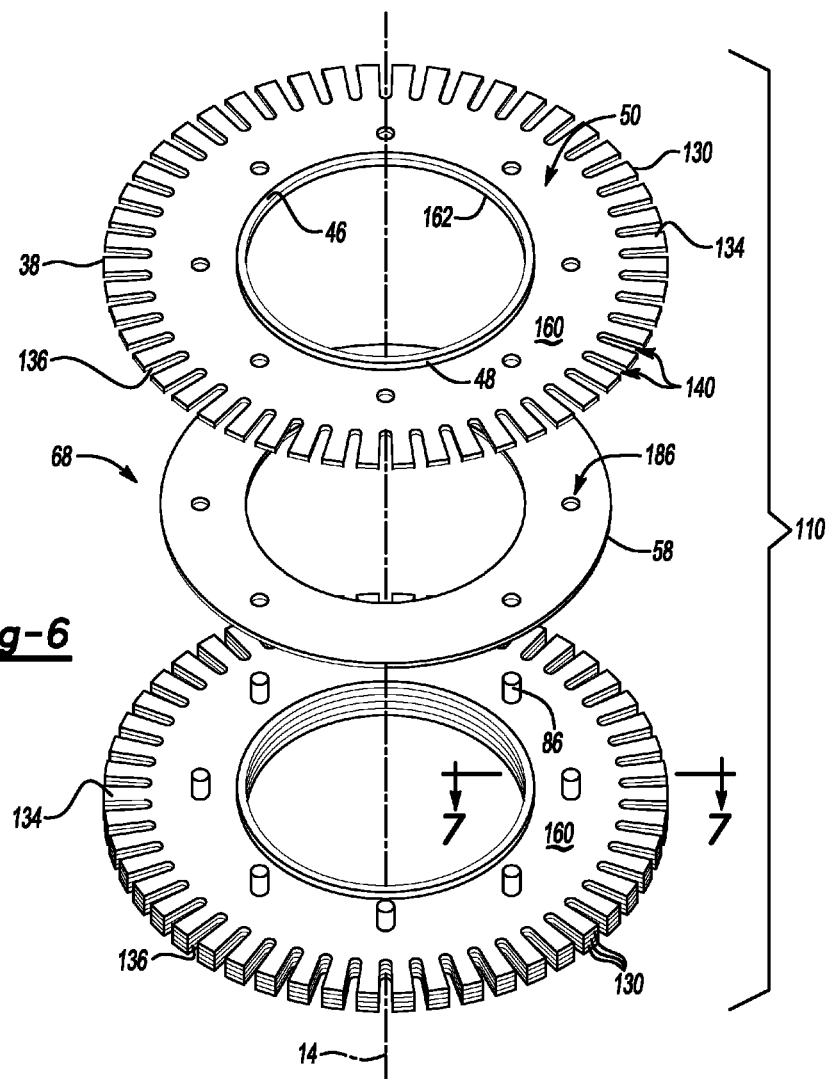
FIG. 6 is a schematic exploded perspective illustration of another embodiment of the end ring assembly of FIG. 1.

Referring now to FIGS. 1, 3, and 6, a method of forming the end ring assembly 10, 110 (FIG. 1) of the rotor 12 (FIG. 1) includes stacking a plurality of annular sheets 30, 130 (FIGS. 3 and 6, respectively) adjacent one another. Each of the plurality of annular sheets 30, 130 may be formed from an electrically-conductive metal, such as, but not limited to, copper or aluminum, and may have a circular shape, as shown in FIGS. 3 and 6. In addition, referring to FIGS. 4 and 7, although shown magnified for purposes of illustration, each annular sheet 30, 130 may have a thickness 32 of from about 1 mm to about 4 mm, e.g., about 2 mm.

Figure 4:
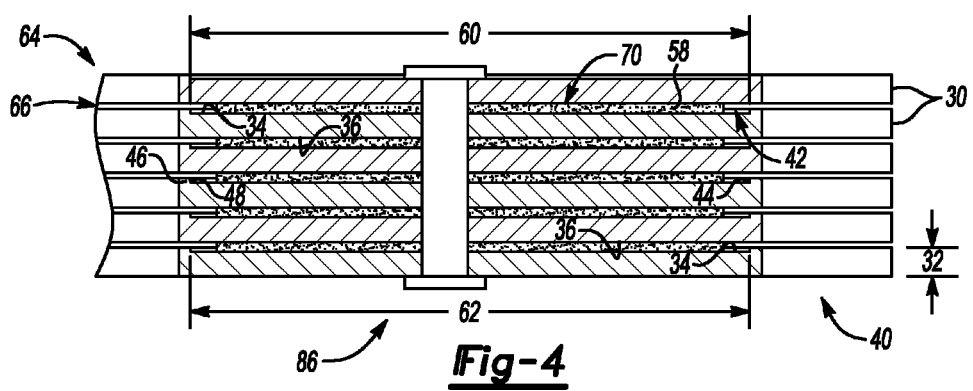
FIG. 4 is a schematic cross-sectional fragmentary illustration of a workpiece for a method of forming the end ring assembly of FIG. 3, taken along section lines 4-4.
Figure 7:
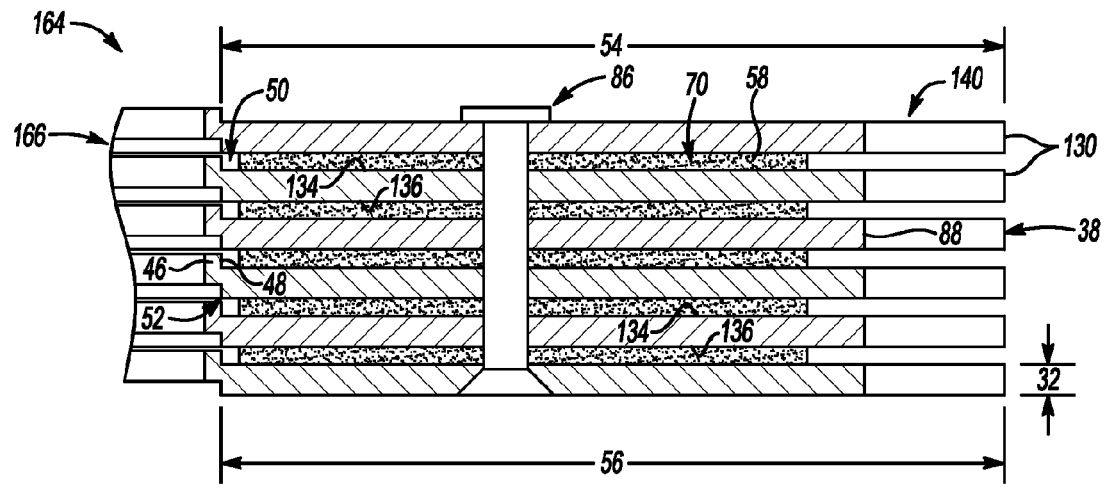
FIG. 7 is a schematic cross-sectional fragmentary illustration of a workpiece for a method of forming the end ring assembly of FIG. 6, taken along section lines 7-7.

With continued reference to FIGS. 4 and 7, each of the plurality of annular sheets 30, 130 has a first surface 34, 134 and a second surface 36, 136 spaced opposite the first surface 34, 134. That is, each of the first surface 34, 134 and the second surface 36, 136 may be disposed in a plane that is substantially perpendicular to the central longitudinal axis 14 (FIG. 1). In addition, as best shown in FIGS. 3 and 6, each of the plurality of annular sheets 30, 130 may have an outer edge 38 spaced apart from the central longitudinal axis 14, and may define a plurality of voids 40, 140 therethrough along the outer edge 38.

As set forth above, the method includes stacking each of the plurality of annular sheets 30, 130 adjacent one another. More specifically, stacking may include arranging the plurality of annular sheets 30, 130 so that the first surface 34, 134 of one of the plurality of annular sheets 30, 130 is stacked adjacent the second surface 36, 136 of a respective adjacent one of the plurality of annular sheets 30, 130. Further, each of the plurality of annular sheets 30, 130 may be stacked adjacent one another so that each of the plurality of voids 40, 140 coaxially aligns along the central longitudinal axis 14. Each of the aligned plurality of voids 40, 140 may therefore be configured to receive a respective one of the plurality of conductor bars 26 (FIG. 1) of the rotor 12 (FIG. 1).

Figure 5:
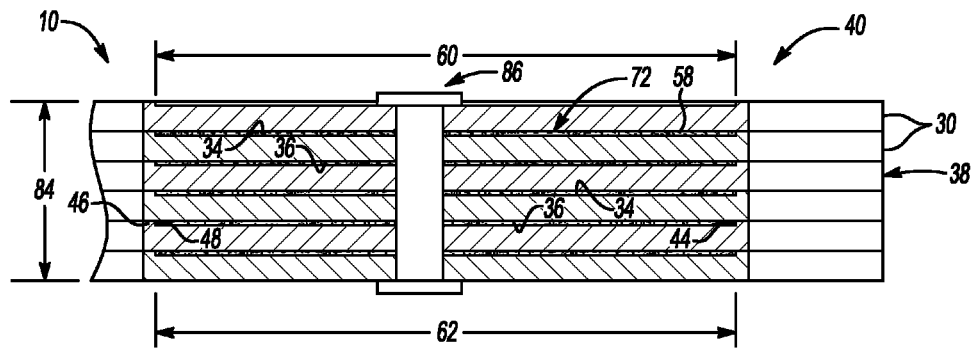
FIG. 5 is a schematic cross-sectional fragmentary illustration of the end ring assembly of FIG. 3, taken along section lines 4-4.

Referring now to FIGS. 3-5, in one embodiment, the first surface 34 of each of the plurality of annular sheets 30 may define an annular channel 42 (FIG. 3) therein spaced apart from and not connected to any of the plurality of voids 40. That is, as best shown in FIG. 3, the annular channel 42 may be defined by an outer wall 44 spaced apart from the central longitudinal axis 14, and a central rim 46 having an inner wall 48 disposed between the outer wall 44 and the central longitudinal axis 14.

Referring now to FIGS. 6-9, in another embodiment, each of the plurality of annular sheets 130 includes the central rim 46 having the inner wall 48 disposed between the central longitudinal axis 14 and the outer edge 38. However, in this embodiment, the first surface 134 of each of the plurality of annular sheets 130 may define an annular recession 50 (FIG. 6) therein extending radially from the inner wall 48 to the outer edge 38. As such, in contrast to the annular channel 42 shown in FIGS. 3 and 4, in this embodiment, the annular recession 50 may extend to each of the plurality of voids 140.

In addition, as best shown in FIG. 7, in this embodiment, the second surface 136 of each of the plurality of annular sheets 130 has an annular protrusion 52 thereon extending radially from the inner wall 48 to the outer edge 38. Further, the annular recession 50 has a first radial length 54, and the annular protrusion 52 has a second radial length 56 that is substantially equal to the first radial length 54. Therefore, in this embodiment, each of the plurality of annular sheets 130 is configured for structurally interlocking with an adjacent one of the plurality of annular sheets 130. That is, as shown in FIGS. 6 and 7, a shape of the annular protrusion 52 may be complementary to a shape of the annular recession 50 so that the plurality of annular sheets 130 mesh or abut when stacked adjacent one another.

Referring again to the method, as described generally with reference to FIGS. 3 and 6, the method also includes sandwiching a braze material 58 between the first surface 34, 134 of each of the plurality of annular sheets 30, 130, and the corresponding second surface 36, 136 of a respective adjacent one of the plurality of annular sheets 30, 130 to thereby form a workpiece 64, 164 (FIGS. 4 and 7, respectively). That is, the braze material 58 may be disposed between adjacent ones of the plurality of annular sheets 30, 130 to form the workpiece 64, 164.

More specifically, for the embodiment shown in FIGS. 3-5 in which the first surface 34 of each of the plurality of annular sheets 30 defines the annular channel 42 (FIG. 3) therein, the braze material 58 may be disposed and confined within the annular channel 42 along a first portion 60 (FIG. 3) of the first surface 34. That is, the braze material 58 may be contained by the annular channel 42 of each of the plurality of annular sheets 30. For example, the braze material 58 may be provided in sheet form (as shown in FIG. 3) or may be provided in ring or wire form (not shown). The braze material 58 may also be sized to fit within the annular channel 42 in preparation for additional processing of the workpiece 64 to form the end ring assembly 10, as set forth in more detail below. In one variation, a thickness (not shown) of the braze material 58 may be larger than a depth of the annular channel 42 so that the workpiece 64 may include gaps 66 (FIG. 4) between stacked adjacent ones of the plurality of annular sheets 30 that will be substantially eliminated during subsequent formation of the end ring assembly 10, as also set forth in more detail below.

Alternatively, for the embodiment shown in FIGS. 6-9 in which the first surface 134 of each of the plurality of annular sheets 130 defines the annular recession 50 (FIG. 6) therein and the second surface 136 of each of the plurality of annular sheets 130 has the annular protrusion 52 (FIG. 7) thereon, the braze material 58 may be disposed on the first portion 160 (FIGS. 6, 8, and 9) of each of the plurality of annular sheets 130. That is, the braze material 58 may abut the central rim 46 and be disposed on the first portion 160, i.e., a part of the annular recession 50, of the first surface 134. For example, as set forth above, the braze material 58 may be provided in sheet form (as shown in FIG. 6) or may be provided in ring or wire form (not shown). The braze material 58 may be sized to fit within the annular recession 50 in preparation for further processing of the workpiece 164 to form the end ring assembly 110, as set forth in more detail below. In one variation, a thickness (not shown) of the braze material 58 may be larger than a depth of the annular recession 50 so that the workpiece 164 may include gaps 166 (FIG. 7) between stacked adjacent ones of the plurality of annular sheets 130 that will be substantially eliminated during subsequent formation of the end ring assembly 110, as also set forth in more detail below.

Further, the braze material 58 may be transitionable between an initial state (represented generally by 68 in FIGS. 3 and 6), a flowable state (represented generally by 70 in FIGS. 4, 7, and 8), and a fixed state (represented generally by 72 in FIGS. 5 and 9) along the first portion 60, 160 (FIGS. 3 and 6). For example, for the embodiment wherein the first surface 34 defines the annular channel 42 (FIG. 3) therein, the braze material 58 may be transitionable between the initial state 68 (FIG. 3), the flowable state 70 (FIG. 4), and the fixed state 72 (FIG. 5) within the annular channel 42. That is, as set forth in more detail below, the braze material 58 may, for example, melt upon exposure to elevated temperatures and transition from the aforementioned sheet, ring, or wire form, i.e., the initial state 68, to a fluid, i.e., the flowable state 70. Subsequently, upon exposure to a reduced temperature, the braze material 58 may transition from the flowable state 70 to the fixed state 72 to thereby braze or adhere the first portion 60 of the first surface 34, i.e., the annular channel 42 (FIG. 3), to a corresponding second portion 62 (FIG. 4) of the second surface 36 of adjacent ones of the plurality of annular sheets 30.

Alternatively, for the embodiment shown in FIGS. 6-9 wherein the first surface 134 of each of the plurality of annular sheets 130 defines the annular recession 50 (FIG. 6) therein and the second surface 136 of each of the plurality of annular sheets 130 has the annular protrusion 52 (FIG. 7) thereon, the braze material 58 may be transitionable between the initial state 68 (FIG. 6), the flowable state 70 (FIGS. 7 and 8), and the fixed state 72 (FIG. 9) within the annular recession 50. That is, as set forth in more detail below, the braze material 58 may, for example, melt upon exposure to elevated temperatures and transition from the aforementioned sheet, ring, or wire form, i.e., the initial state 68, to a fluid, i.e., the flowable state 70. Subsequently, upon exposure to a reduced temperature, the braze material 58 may transition from the flowable state 70 to the fixed state 72 to thereby braze or adhere the first portion 160, i.e., a part of the annular recession 50 (FIGS. 6, 8, and 9), of the first surface 134 to the corresponding second portion 162 (FIGS. 8 and 9), i.e., a part of the annular protrusion 52 (FIG. 7), of the second surface 136 of adjacent ones of the plurality of annular sheets 130.

Non-limiting examples of suitable braze materials 58 include binary copper-phosphorus alloys; copper-phosphorus alloys including silver; copper-phosphorus alloys including near-eutectic silver; copper-phosphorus alloys including tin; aluminum-silicon alloys; and combinations thereof.

Figure 8:
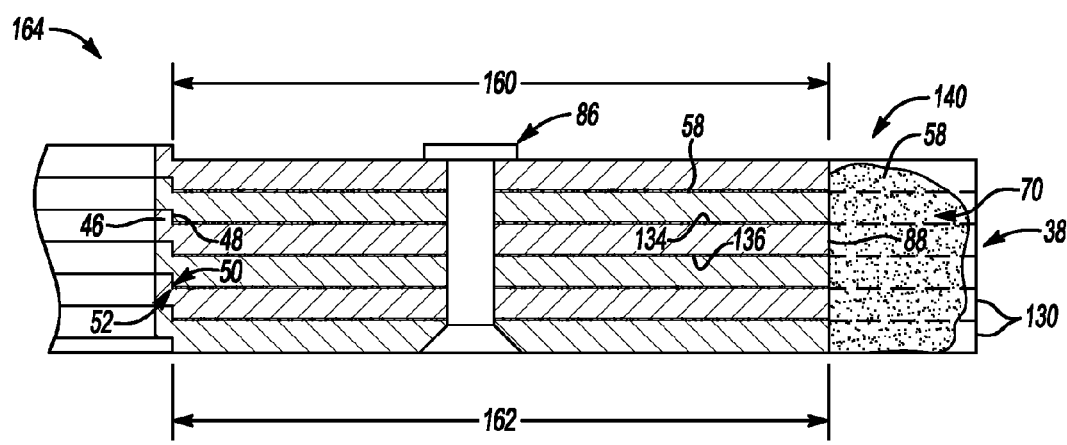
FIG. 8 is a schematic cross-sectional fragmentary illustration of another embodiment of the workpiece of FIG. 7, taken along section lines 7-7.

Specific non-limiting examples of suitable binary copper-phosphorus alloys include phosphorus present in the binary copper-phosphorus alloy in an amount of from about 6.2 parts by weight to about 7.8 parts by weight based on 100 parts by weight of the binary copper-phosphorus alloy, e.g., phosphorus present in an amount of about 7.25 parts by weight based on 100 parts by weight of the binary copper-phosphorus alloy. Such binary copper-phosphorus alloys may have a melting temperature of from about 710° C. to about 890° C., e.g., from about 710° C. to about 795° C. As used herein, the terminology "melting temperature" refers to a temperature at which the braze material 58 transitions from the initial state 68 (FIGS. 3 and 6) to the flowable state 70 (FIGS. 4, 7, and 8).

Specific non-limiting examples of suitable copper-phosphorus alloys including silver include phosphorus present in an amount of from about 5 parts by weight to about 7.25 parts by weight based on 100 parts by weight of the copper-phosphorus alloy including silver, and silver present in an amount of from about 2 parts by weight to about 15 parts by weight based on 100 parts by weight of the copper-phosphorus alloy including silver. For example, phosphorus may be present in an amount of about 6 parts by weight, and silver may be present in an amount of about 5 parts by weight based on 100 parts by weight of the copper-phosphorus alloy including silver. Such copper-phosphorus alloys including silver may have a melting temperature of from about 640° C. to about 825° C., e.g., from about 645° C. to about 815° C.

Specific non-limiting examples of suitable copper-phosphorus alloys including near-eutectic silver include phosphorus present in an amount of from about 6.25 parts by weight to about 7.05 parts by weight based on 100 parts by weight of the copper-phosphorus alloy including near-eutectic silver, and silver present in an amount of about 18 parts by weight based on 100 parts by weight of the copper-phosphorus alloy including near-eutectic silver. Such copper-phosphorus alloys including near-eutectic silver may have a melting temperature of from about 640° C. to about 660° C., e.g., about 645° C.

Specific non-limiting examples of suitable copper-phosphorus alloys including tin include phosphorus present in an amount of about 6.2 parts by weight based on 100 parts by weight of the copper-phosphorus alloy including tin, and tin present in an amount of about 4.3 parts by weight based on 100 parts by weight of the copper-phosphorus alloy including tin. Such copper-phosphorus alloys including tin may have a melting temperature of from about 650° C. to about 700° C.

For embodiments of the end ring assembly 10, 110 including the plurality of annular sheets 30, 130 formed from aluminum, an aluminum-silicon alloy may be useful as the braze material 58. Specific non-limiting examples of suitable aluminum-silicon alloys may optionally include magnesium and/or copper.

Figure 10:
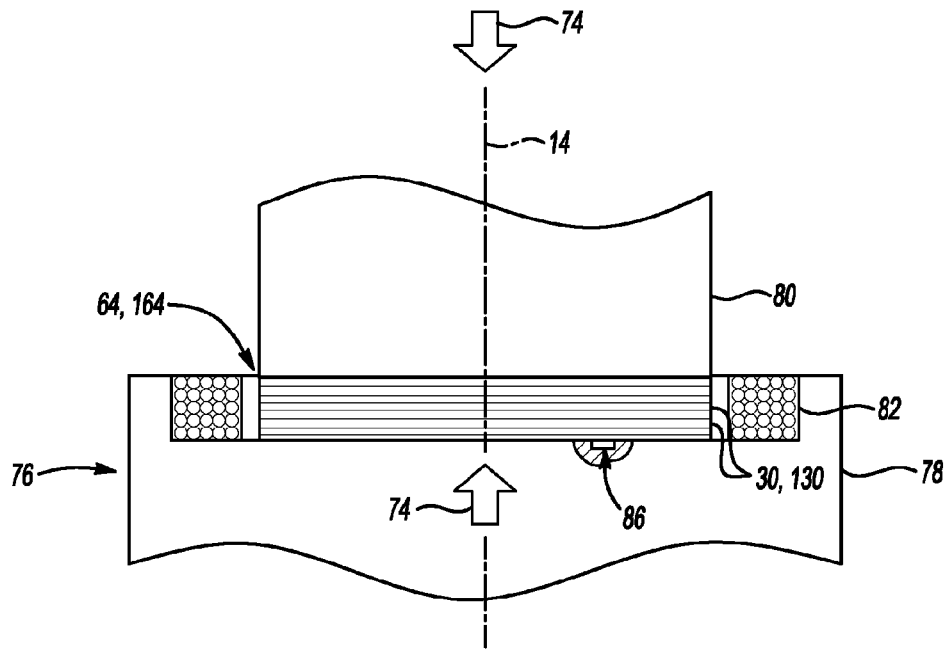
FIG. 10 is a schematic partially cross-sectional fragmentary illustration of a portion of the method of forming the end ring assembly of FIGS. 1, 3, and 6.

Referring now to FIG. 10, the method also includes, after sandwiching, compressing the workpiece 64, 164. For example, the workpiece 64, 164 may be compressed by applying a controllable force (represented generally by arrows 74 in FIG. 10) supplied by a press 76 to the workpiece 64, 164 to thereby compress each of the plurality of annular sheets 30, 130 against each adjacent layer of braze material 58 (FIGS. 3 and 6). More specifically, the workpiece 64, 164 may be placed on a lower stationary platen 78, and a moveable upper platen 80 may translate along the central longitudinal axis 14 to thereby compress the workpiece 64, 164.

With continued reference to FIG. 10, the method also includes, after sandwiching, heating the workpiece 64, 164 to transition the braze material 58 (FIGS. 3 and 6) from the initial state 68 (FIGS. 3 and 6) to the flowable state 70 (FIGS. 4, 7, and 8). In one variation, the workpiece 64, 164 may be heated concurrent to compressing. In another variation, the workpiece 64, 164 may be heated prior to compressing. For example, the workpiece 64, 164 may be preheated before insertion into the press 76. The braze material 58 may be heated, e.g., to above the aforementioned melting temperature, so that the braze material 58 flows along the first portion 60, 160 (FIGS. 3 and 6) of the first surface 34, 134 (FIGS. 3 and 6) of each of the plurality of annular sheets 30, 130.

Referring again to FIG. 10, the workpiece 64, 164 may be heated in any manner. By way of a non-limiting example, the press 76 may include an induction heating coil 82 configured to surround the workpiece 64, 164 when the workpiece 64, 164 is disposed within the press 76. However, the workpiece 64, 164 may also be heated by, for example, a plurality of gas-fired torches (not shown) or electrically heated surfaces or platens (not shown).

Compressing and heating may be defined as brazing. For braze materials 58 (FIGS. 3 and 6) including copper that includes oxygen, i.e., tough pitch, a protective brazing environment may minimize oxide reduction within the copper and gas porosity. Generally, braze materials 58 including copper and phosphorus are self-fluxing and may not require a chemical flux. However, for variations of the braze material 58 requiring a flux, the optional flux may be coated on the braze material 58.

Referring again to the method, after sandwiching, e.g., during compressing and heating, the braze material 58 may transition from the initial state 68 (FIGS. 3 and 6) to the flowable state 70 (FIGS. 4, 7, and 8) and flow along the first portion 60, 160 (FIGS. 3 and 6) of the first surface 34, 134 of each of the plurality of annular sheets 30, 130. For example, for the embodiment in which the first surface 34 defines the annular channel 42 (FIG. 3) therein, the braze material 58 may flow within, and be contained by, the annular channel 42 so as to fill the annular channel 42 and contact the corresponding second portion 62 (FIG. 4) of the second surface 36 of the respective adjacent one of the plurality of annular sheets 30.

Therefore, heating the workpiece 64, 164 (FIG. 10) may include confining the braze material 58 (FIG. 3) within the annular channel 42 (FIG. 3). That is, the annular channel 42 may be configured for controlling or directing a flow of the braze material 58 during formation of the end ring assembly 10. As such, as the aforementioned gaps 66 (FIG. 4) diminish and disappear during compressing, the braze material 58 in the flowable state 70 (FIG. 4) is confined by the annular channel 42. Further, contact between the braze material 58 and each of the first portion 60 and second portion 62 may ensure wetting of the first and second portions 60, 62 during compressing and heating. In this embodiment, the braze material 58 in the flowable state 70 does not flow to the plurality of voids 40 (FIG. 3) so that the braze material 58 does not fill the plurality of voids 40 and thereby inhibit insertion of the conductor bars 26 (FIG. 1) during formation of the rotor 12 (FIG. 1).

Similarly, for the embodiment in which the first surface 134 of each of the plurality of annular sheets 130 defines the annular recession 50 (FIG. 6) therein and the second surface 136 of each of the plurality of annular sheets 130 has the annular protrusion 52 (FIGS. 7-9) thereon, the braze material 58 transitions from the initial state 68 (FIG. 6) to the flowable state 70 (FIG. 7) and flows along the annular recession 50 from the central rim 46 towards the outer edge 38. That is, as the braze material 58 transitions from the initial state 68 to the flowable state 70, the braze material 58 may flow along the annular recession 50 towards both the central rim 46 and the outer edge 38, i.e., both towards and away from the central longitudinal axis 14 (FIG. 6), but may not abut the outer edge 38 (FIG. 8). Therefore, in this embodiment, the braze material 58 may flow into each of the plurality of voids 140 along the outer edge 38, as best shown in FIG. 8. However, as set forth in more detail below, the braze material 58 may not flow along the entire first radial length 54 (FIG. 7) to the outer edge 38. Rather, the braze material 58 may flow over an edge 88 (FIGS. 7 and 8) and therefore may flow to less than the entire first radial length 54 of the annular recession 58, i.e., the first portion 160.

Therefore, referring to FIG. 8, heating the workpiece 164 may include at least partially filling each of the plurality of voids 140 with the braze material 58. As such, the annular recession 50 and the annular protrusion 52 may cooperate and together be configured for controlling or directing the flow of the braze material 58 during formation of the end ring assembly 110. As the aforementioned gaps 166 (FIG. 7) diminish and disappear during compressing, the braze material 58 in the flowable state 70 flows along the annular recession 50. Further, contact between the braze material 58 and each of the first portion 160 and second portion 162 may ensure wetting of the first and second portions 160, 162 during compressing and heating. In this embodiment, the braze material 58 in the flowable state 70 flows to the plurality of voids 140 (FIG. 8) so that braze material 58 at least partially fills the plurality of voids 140. Such at least partial filling of the plurality of voids 140 may be useful for concurrently attaching the conductor bars 26 (FIG. 1) to the end ring assembly 110 in a single manufacturing process during formation of the rotor 12 (FIG. 1).

As such, referring again to FIG. 1, the method may further include, after sandwiching, disposing a conductor bar 26 into at least one of the plurality of voids 40, 140 (FIGS. 3 and 6) and attaching the conductor bar 26 to the workpiece 64, 164 with the braze material 58. For example, one conductor bar 26 may be inserted into each of the plurality of voids 40, 140 in preparation for forming the rotor 12, as shown in FIG. 1. Therefore, referring again to FIG. 8, the aforementioned at least partial filling of the plurality of voids 140 may wet and join each respective conductor bar 26 to the stacked plurality of annular sheets 130 to thereby attach the conductor bar 26 or plurality of conductor bars 26 to the workpiece 164. Therefore, the rotor 12 (FIG. 1) may be formed in a single manufacturing or formation process.

Figure 9:
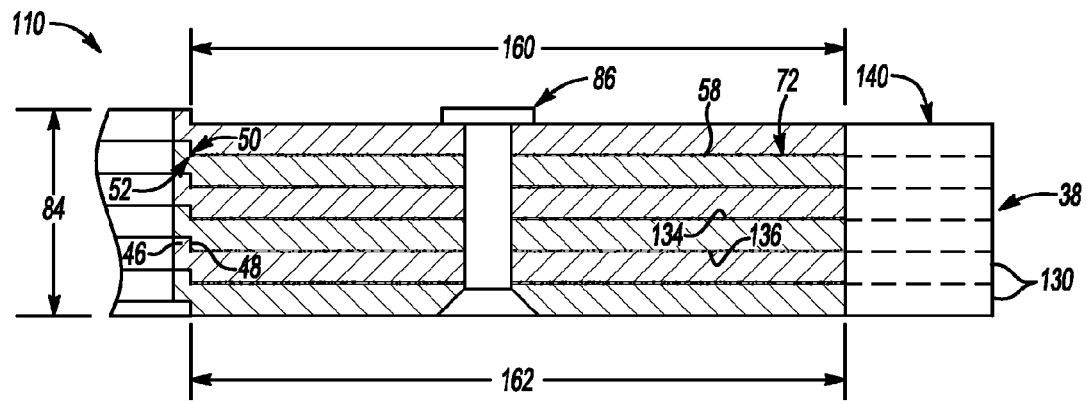
FIG. 9 is a schematic cross-sectional fragmentary illustration of the end ring assembly of FIG. 6, taken along section lines 7-7.

Referring now to FIGS. 4, 5, and 7-9, the method further includes, after heating, cooling the workpiece 64, 164 (FIGS. 4 and 7) to transition the braze material 58 from the flowable state 70 (FIGS. 4, 7, and 8) to the fixed state 72 (FIGS. 5 and 9) and thereby join only the first portion 60, 160 (FIGS. 4 and 8) of the first surface 34, 134 of each of the plurality of annular sheets 30, 130, and the corresponding second portion 62, 162 (FIGS. 4 and 8) of the second surface 36, 136 of the respective adjacent one of the plurality of annular sheets 30, 130 without joining an entirety of the first surface 34, 134 of each of the plurality of annular sheets 30, 130 and the second surface 36, 136 of the respective adjacent one of the plurality of annular sheets 30, 130 to form the end ring assembly 10, 110 (FIGS. 5 and 9). That is, the workpiece 64, 164 is cooled to braze the first portion 60, 160 to the corresponding second portion 62, 162 of each of the plurality of annular sheets 30, 130. For example, the workpiece 64, 164 may be cooled by removing the workpiece 64, 164 from the heat source, e.g., the induction heating coil 82 (FIG. 10) of the press 76 (FIG. 10), the gas-fired torches (not shown), and/or the electrically heated surfaces or platens (not shown).

Therefore, referring now to FIGS. 5 and 9, the resulting end ring assembly 10, 110 includes the plurality of annular sheets 30, 130 stacked adjacent one another, as set forth above. More specifically, the resulting end ring assembly 10, 110 may include a total of from 2 to 8 individual annular sheets 30, 130 stacked adjacent one another. For example, in one non-limiting variation, the end ring assembly 10, 110 may include 6 annular sheets 30, 130 stacked adjacent one another. Therefore, the end ring assembly 10, 110 may have a total thickness 84 (FIGS. 5 and 9) of from about 4 mm to about 16 mm, e.g., from about 10 mm to about 12 mm.

In addition, referring now to FIGS. 3 and 6, to ensure sufficient alignment of the plurality of voids 40, 140 of each of the plurality of annular sheets 30, 130, the end ring assembly 10, 110 may further include at least one alignment element 86 configured for coaxially aligning each of the plurality of annular sheets 30, 130 along the central longitudinal axis 14. For example, the end ring assembly 10, 110 may include one or more alignment elements 86, such as rivets and corresponding rivet holes 186 defined by each annular sheet 30, 130. In particular, such rivets may have a length that extends beyond the stacked plurality of annular sheets 30, 130 during formation of the end ring assembly 10, 110. The rivets may then be headed after assembly of the plurality of annular sheets 30, 130. For example, each rivet may include an upper head and a lower head. The lower head of each rivet may be recessed into a lowermost one of the plurality of annular sheets 30, 130, and the upper head may be partially headed or staked after the plurality of annular sheets 30, 130 and the braze material 58 are stacked in the aforementioned configuration to facilitate handling of the workpiece 64, 164 (FIGS. 4 and 7, respectively) during subsequent processing operations.

With continued reference to FIGS. 3 and 6, the one or more alignment elements 86 may be configured to coaxially align the plurality of annular sheets 30, 130 along the central longitudinal axis 14. Alternatively or additionally, the end ring assembly 10, 110 may include cut-outs (not shown) or other structural features (not shown) to ensure sufficient alignment of the plurality of voids 40, 140 of each of the plurality of annular sheets 30, 130. The one or more alignment elements 86 may therefore optimize alignment of the aforementioned complex shape of each of the plurality of annular sheets 30, 130, e.g., the plurality of voids 40, 140, and allow formation of a high-precision end ring assembly 10, 110 without costly and/or difficult machining.

As shown in FIGS. 5 and 9, the end ring assembly 10, 110 may be substantially free from any gap 66, 166 (FIGS. 4 and 7, respectively) between adjacent ones of the plurality of annular sheets 30, 130. Therefore, the complementarily-shaped adjacent ones of the plurality of annular sheets 30, 130 may be substantially free from any gap 66, 166 therebetween. Rather, the end ring assembly 10, 110 includes the braze material 58 sandwiched between and joining only the first portion 60, 160 (FIGS. 5 and 9) of the first surface 34, 134 of each of the plurality of annular sheets 30, 130, and the corresponding second portion 62, 162 (FIGS. 5 and 9) of the second surface 36, 136 of a respective adjacent one of the plurality of annular sheets 30, 130 without joining an entirety of the first surface 34, 134 of each of the plurality of annular sheets 30, 130 and the second surface 36, 136 of the respective adjacent one of the plurality of annular sheets 30, 130. Therefore, the braze material 58 joins only a targeted area of adjacent ones of the plurality of annular sheets 30, 130, i.e., the first portion 60, 160 and the second portion 62, 162 of adjacent ones of the plurality of annular sheets 30, 130. Stated differently, the braze material 58 is not sandwiched between an entirety of the first surface 34, 134 and the second surface 36, 136 of adjacent ones of the plurality of annular sheets 30, 130.

For example, for the embodiment shown in FIGS. 3-5 in which the first surface 34 defines the annular channel 42 (FIG. 3) therein, the braze material 58 may be disposed and confined within the annular channel 42 along the first portion 60, as set forth above. That is, the braze material 58 may not spill out from or overflow the annular channel 42 of each of the plurality of annular sheets 30. Rather, the braze material 58 may be transitionable between the initial state 68 (FIG. 3), the flowable state 70 (FIG. 4), and the fixed state 72 (FIG. 5) within the annular channel 42.

Moreover, as shown in FIG. 5, the braze material 58 may fill a substantial entirety of the annular channel 42 in the fixed state 72. That is, a volume of the annular channel 42 may be substantially equal to a volume of the braze material 58 in the flowable state 70 (FIG. 4). Therefore, as the braze material 58 transitions from the initial state 68 (FIG. 3) to the flowable state 70 (FIG. 4) during heating of the workpiece 64, the braze material 58 may flow to fill the substantial entirety of the annular channel 42. The braze material 58 may then transition from the flowable state 70 to the fixed state 72 (FIG. 5) upon cooling of the workpiece 64 to thereby join adjacent ones of the plurality of annular sheets 30. However, as shown in FIG. 5, rather than joining the entirety of the first surface 34 and the second surface 36 with the braze material 58, the braze material 58 is sandwiched between and joins only the first portion 60 of the first surface 34 of each of the plurality of annular sheets 30, and the corresponding second portion 62 of the second surface 36 of the respective adjacent one of the plurality of annular sheets 30.

Similarly, for the embodiment shown in FIGS. 6-9 in which the first surface 134 of each of the plurality of annular sheets 130 defines the annular recession 50 (FIG. 6) therein and the second surface 136 of each of the plurality of annular sheets 130 has the annular protrusion 52 (FIG. 7) thereon, the braze material 58 may be disposed on the first portion 160 of each of the plurality of annular sheets 130, and join each of the plurality of annular sheets 130 to a respective adjacent one of the plurality of annular sheets 130 along the annular protrusion 52, as set forth above. That is, a volume of the annular recession 50 may be substantially equal to a volume of the braze material 58 in the flowable state 70 (FIG. 7). Therefore, the braze material 58 may abut or be retained by the central rim 46, but may also at least partially fill the plurality of voids 140, without flowing to the outer edge 38 (FIG. 8) of each of the plurality of annular sheets 130.

That is, the braze material 58 may be transitionable between the initial state 68 (FIG. 6), the flowable state 70 (FIGS. 7 and 8), and the fixed state 72 (FIG. 9) along the first portion 160, i.e., along the annular recession 50. In particular, as the braze material 58 transitions from the initial state 68 to the flowable state 70 during heating of the workpiece 164, the braze material 58 may flow along the annular recession 50, and may spill over an edge 88 (FIG. 7) to each of the plurality of voids 140. That is, the braze material 58 may continue to wet each of the plurality of annular sheets 130 but may not flow along the entire first radial length 54 (FIG. 7) to the outer edge 38. That is, in this embodiment, the braze material 58 may flow both towards the inner wall 48 and towards the outer edge 38, but may not abut the outer edge 38. As such, the braze material 58 may spill over the edge 88 (FIG. 7) to thereby fill the plurality of voids 140, as best shown in FIG. 8. Therefore, the braze material 58 may then transition from the flowable state 70 to the fixed state 72 upon cooling of the workpiece 164 to thereby join adjacent ones of the plurality of annular sheets 130 and at least partially fill the plurality of voids 140. That is, the braze material 58 may at least partially fill each of the plurality of voids 140 in the fixed state 72. As such, one or more conductor bars 26 (FIG. 1) may be disposed within the plurality of voids 40, 140 and attached to the end ring assembly 10, 110. However, rather than joining the entirety of the first surface 134 and the second surface 136 with the braze material 58, the braze material 58 is sandwiched between and joins only the first portion 160 of the first surface 134 of each of the plurality of annular sheets 130, and the corresponding second portion 162 of the second surface 136 of the respective adjacent one of the plurality of annular sheets 130.

Therefore, the end ring assembly 10, 110 and method of forming the end ring assembly 10, 110 enable economical manufacture of rotors 12 for electromagnetic machines. For example, the rotors 12 may be formed in a single manufacturing operation wherein conductor bars 26 are attached to the end ring assembly 10, 110 during formation of the end ring assembly 10, 110. Further, the method provides end ring assemblies 10, 110 formed from multiple annular sheets 30, 130 that are brazed together, and avoids expensive or difficult casting and/or machining. Further, the method and end ring assemblies 10, 110 provide three-dimensional flow control regions, e.g., the annular channel 42 (FIG. 3), and the combination of the annular recession 50 (FIG. 7) and annular protrusion 52 (FIG. 7), to control the flow of braze material 58 during formation of the end ring assemblies 10, 110. Stated differently, the method and aforementioned structure of the annular sheets 30, 130 controls or directs the flow of braze material 58 during heating and cooling of the braze material 58. Further, the end ring assemblies 10, 110 may be formed from copper or aluminum, and may have complex, intricate shapes according to desired operation of the rotor 12.

While the best modes for carrying out the disclosure have been described in detail, those familiar with the art to which this disclosure relates will recognize various alternative designs and embodiments for practicing the disclosure within the scope of the appended claims.

The invention claimed is:

1. An end ring assembly for a rotor, wherein the rotor is rotatable about a central longitudinal axis, the end ring assembly comprising:
a plurality of annular sheets stacked adjacent one another, wherein each of the plurality of annular sheets has:
a first surface;
a second surface spaced opposite the first surface;
an outer edge spaced apart from the central longitudinal axis; and
a central rim having an inner wall disposed between the central longitudinal axis and the outer edge;
wherein each of the plurality of annular sheets defines a plurality of voids therethrough along the outer edge;
wherein the first surface of each of the plurality of annular sheets defines an annular recession therein extending radially from the inner wall to the outer edge;
wherein the second surface of each of the plurality of annular sheets has an annular protrusion thereon extending radially from the inner wall to the outer edge;
wherein the annular recession has a first radial length and the annular protrusion has a second radial length that is substantially equal to the first radial length; and
a braze material sandwiched between and joining only a first portion of the first surface of each of the plurality of annular sheets and a corresponding second portion of the second surface of a respective adjacent one of the plurality of annular sheets without joining an entirety of the first surface of each of the plurality of annular sheets and the second surface of the respective adjacent one of the plurality of annular sheets.

2. The end ring assembly of claim 1, wherein each of the plurality of annular sheets is configured for structurally interlocking with an adjacent one of the plurality of annular sheets.

3. The end ring assembly of claim 1, wherein the braze material is transitionable between an initial state, a flowable state, and a fixed state along the first portion within the annular recession.

4. The end ring assembly of claim 1, wherein the annular recession has a depth and the braze material has a thickness that is greater than the depth.

5. The end ring assembly of claim 4, wherein the braze material has a sheet form.

6. The end ring assembly of claim 1, wherein a shape of the annular protrusion is complementary to a shape of the annular recession so that adjacent ones of the plurality of annular sheets mesh when stacked adjacent one another.

7. An end ring assembly for a rotor, wherein the rotor is rotatable about a central longitudinal axis, the end ring assembly comprising:
a plurality of annular sheets stacked adjacent one another, wherein each of the plurality of annular sheets has:
a first surface;
a second surface spaced opposite the first surface;
an outer edge spaced apart from the central longitudinal axis; and
a central rim having an inner wall disposed between the central longitudinal axis and the outer edge;
wherein each of the plurality of annular sheets defines a plurality of voids therethrough along the outer edge;
wherein the first surface of each of the plurality of annular sheets defines an annular recession therein extending radially from the inner wall to the outer edge;
wherein the second surface of each of the plurality of annular sheets has an annular protrusion thereon extending radially from the inner wall to the outer edge;
wherein the annular recession has a first radial length and the annular protrusion has a second radial length that is substantially equal to the first radial length; and
a braze material sandwiched between and joining only a first portion of the first surface of each of the plurality of annular sheets and a corresponding second portion of the second surface of a respective adjacent one of the plurality of annular sheets without joining an entirety of the first surface of each of the plurality of annular sheets and the second surface of the respective adjacent one of the plurality of annular sheets;
wherein the braze material is disposed on the first portion of each of the plurality of annular sheets, and joins each of the plurality of annular sheets to a respective adjacent one of the plurality of annular sheets along the annular protrusion.

8. The end ring assembly of claim 7, wherein each of the plurality of annular sheets is configured for structurally interlocking with an adjacent one of the plurality of annular sheets.

9. The end ring assembly of claim 7, wherein a shape of the annular protrusion is complementary to a shape of the annular recession so that adjacent ones of the plurality of annular sheets mesh when stacked adjacent one another.

10. The end ring assembly of claim 7, wherein the braze material is transitionable between an initial state, a flowable state, and a fixed state along the first portion within the annular recession.

11. The end ring assembly of claim 7, wherein the annular recession has a depth and the braze material has a thickness that is greater than the depth.

12. The end ring assembly of claim 11, wherein the braze material has a sheet form.

13. An end ring assembly for a rotor, wherein the rotor is rotatable about a central longitudinal axis, the end ring assembly comprising:
a plurality of annular sheets stacked adjacent one another, wherein each of the plurality of annular sheets has:
a first surface;
a second surface spaced opposite the first surface;

an outer edge spaced apart from the central longitudinal axis; and a central rim having an inner wall disposed between the central longitudinal axis and the outer edge;

wherein each of the plurality of annular sheets defines a plurality of voids therethrough along the outer edge;

wherein the first surface of each of the plurality of annular sheets defines an annular recession therein extending radially from the inner wall to the outer edge; and a braze material sandwiched between and joining only a first portion of the first surface of each of the plurality of annular sheets and a corresponding second portion of the second surface of a respective adjacent one of the plurality of annular sheets without joining an entirety of the first surface of each of the plurality of annular sheets and the second surface of the respective adjacent one of the plurality of annular sheets;

wherein the braze material is transitionable between an initial state, a flowable state, and a fixed state along the first portion;

wherein the braze material at least partially fills each of the plurality of voids in the fixed state.

14. The end ring assembly of claim 13, wherein each of the plurality of annular sheets is configured for structurally interlocking with an adjacent one of the plurality of annular sheets.

15. The end ring assembly of claim 13, wherein a shape of the annular protrusion is complementary to a shape of the annular recession so that the plurality of annular sheets mesh when stacked adjacent one another.

16. The end ring assembly of claim 13, wherein the annular recession has a depth and the braze material has a thickness that is greater than the depth.

17. The end ring assembly of claim 16, wherein the braze material has a sheet form.

* * * * *